United States Patent [19]

Pearman

[11] Patent Number: 4,926,678
[45] Date of Patent: May 22, 1990

[54] METHOD AND APPARATUS FOR PROVING ELECTRONIC GAS METERS AT LOW FLOW RATES

[75] Inventor: Arthur N. J. Pearman, St. Paul, Minn.

[73] Assignee: Gas Research Institute, Chicago, Ill.

[21] Appl. No.: 255,644

[22] Filed: Oct. 11, 1988

[51] Int. Cl.$^5$ .............................................. G01F 25/00
[52] U.S. Cl. ................................................................ 73/3
[58] Field of Search ................................................. 73/3

[56] References Cited

U.S. PATENT DOCUMENTS

| | | | |
|---|---|---|---|
| 3,933,027 | 1/1976 | Mehall | 73/3 |
| 3,937,048 | 2/1976 | St. Clair et al. | 73/3 |
| 4,027,523 | 6/1977 | St. Clair | 73/3 |
| 4,306,457 | 12/1981 | Fukui et al. | 73/861.77 |
| 4,375,667 | 3/1983 | Buchan | 73/861 X |
| 4,628,743 | 12/1986 | Miller, Jr. et al. | 73/204.25 X |
| 4,685,324 | 8/1987 | Bourdon et al. | 73/3 |
| 4,766,759 | 8/1988 | Cohrs et al. | 73/3 |
| 4,821,557 | 4/1989 | Beeson, III | 73/3 |

OTHER PUBLICATIONS

On Set Computer Corp., "Tattletale Model III", Application Note, pp. 4, 5 and 10–11, published by Oct. 1988.
Hewlett Packard, "Quadrature Decoder/Counter Interface IC", HCTL-2000; 14 pages; pp. (4–67) through (4–80), from 88-89 Opto Electronic Designers Catalog; Technical Data dated Jan. 1986, published by Oct. 1988.

Primary Examiner—Tom Noland
Attorney, Agent, or Firm—Thomas W. Speckman

[57] ABSTRACT

A method and apparatus for proving an electronic gas meter at low flow rates includes comparing the rate of descent of the test bell of a bell prover with the instantaneous flow rate measured by a fluid flow measuring circuit for the meter, the rate of descent of the test bell being determined by counting the number of clock pulses which are generated by a clock pulse generator of the test circuitry signal to provide a measure of actual volume flow rate for comparison with the measured volume flow rate obtained from the electronic gas meter.

11 Claims, 4 Drawing Sheets

METHOD AND APPARATUS FOR PROVING ELECTRONIC GAS METERS AT LOW FLOW RATES

BACKGROUND OF THE INVENTION

This invention relates to methods and apparatus for proving fluid flow meters, such as gas meters and the like, and in particular to a method and apparatus for proving such fluid flow meters at low flow rates.

Gas meters presently employed by the gas utility industry are mechanical meters of the double bellows type. Such meters are proven using apparatus commonly referred to as a bell prover system. In such a system, a copper bell of accurate dimension is allowed to descend at a constant rate into a tank of light oil or water. As the bell descends, a suitable test fluid, typically air or natural gas, is passed through the meter under test. The volume of air or natural gas which is passed through the meter is determined by the amount of linear movement of the bell. The position of the bell accurately defines the volume of test fluid which has been passed through the meter under test.

Typically, in proving gas meters using bell prover systems, a source of air or natural gas is connected to the meter under test and the flow rate of the gas meter is adjusted by selecting a suitable orifice which is connected in series with the source of test fluid and the meter under test. With the flow rate of the gas meter set, the proof run is initiated. With gas meters presently available, initiation of a proof run is effected by interrupting a light source using the calibration dial of the meter. At the start of the proof run, the test fluid supply is switched rapidly to the bell. After a selected volume of the test fluid, typically 1, 2 or 5 cubic feet, has passed through the meter of the test as indicated by the calibration dial and the bell, the light source is interrupted because the calibration dial has registered one complete revolution. When the light source is again interrupted, the fluid outlet of the bell is closed off, terminating the supply of the test fluid to the meter.

The position of the bell is then accurately recorded electronically, yielding the exact amount of the test fluid that has passed through the meter under test during the time it recorded passage of one cubic foot of fluid as indicated by the calibration dial of the meter. From this measurement, the accuracy or proof of the meter can be calculated. The information obtained can be used to adjust the mechanical mechanism of a meter that fails the proof test. One shortcoming of this measurement arrangement is that at a typical very low flow rate, say 0.25 cubic foot per hour (cfh), it will take four hours to complete a one cubic foot proof test on a gas meter.

In the co-pending U.S. patent application Ser. No. 140,714 of Pearman et al, which is entitled ELECTRONIC GAS METER, and which is assigned to the assignee of this application, there is disclosed a gas meter which includes a solid state sensor and solid state signal processing circuits for measuring gas flow volume. This gas meter does not have a calibration dial available for controlling a proof test in a manner similar to mechanical meters of the double bellows type as described above. Also, the meter does not have a mechanical adjustment to improve its accuracy. Thus, proof test techniques and calibration adjustments heretofore used for mechanical gas meters cannot be used on electronic gas meters of this type.

Thus, it would be desirable to have a method and apparatus for proving a fluid flow meter of the type incorporating solid state sensing and signal processing circuits.

It would also be desirable to have a method and apparatus for proving a fluid flow meter at low flow rates.

SUMMARY OF THE INVENTION

It is an object of the present invention to provide a new and improved method and apparatus for proving fluid flow meters and the like.

Another object of the invention is to provide a method and apparatus for proving fluid flow meters of the type employing solid state sensor and signal processing circuits for measuring gas volumetric flow.

Yet another object of the invention is to provide a method and apparatus for proving fluid flow meters at low flow rates.

A further object of the invention is to shorten the time required for proving fluid flow meters.

These and other objects are achieved by the present invention which has provided a method and apparatus for proving a fluid flow meter of the type including a solid state sensor and signal processing circuit for measuring gas volume flow.

In accordance with one aspect of the invention, there is provided a method for proof testing of an electronic fluid flow meter and the like at low flow rates, which includes supplying test fluid to the meter under test, measuring the actual volume flow rate of the test fluid supplied to the meter using a volume measurement standard apparatus and a timing means for measuring the time taken for the test fluid to pass through the meter, enabling the meter to measure the volume flow rate of test fluid supplied to the meter and to provide data indicative of measured volume flow rate, and correlating the measured volume flow rate for the fluid to be passed through the meter with the actual volume flow rate in proving the operation of the meter.

In accordance with another aspect of the invention, there is provided an apparatus for use in proving at low flow rates a fluid flow meter having flow measuring means, the apparatus including a test bell which is moved between first and second positions in measuring a volume of a test fluid, an encoder means for generating electrical pulses indicative of the instantaneous position of the test bell as it moves between the first and second position, and means communicating the test bell with the meter for supplying the measured test fluid to the meter, the combination comprising, controller means including signal processing means, pulse detecting means coupled to the encoder means to receive the pulses generated thereby, and to provide pulses indicative of the duration of at least one of the encoder pulses, means coupling the signal processing means to the meter flow measuring means, the signal processing means responding to a first pulse of the pulse detecting means to initiate a time interval and to enable the flow measuring means to measure the volume of test fluid being passed through the meter, the signal processing means responding to a second pulse of the pulse detecting means to end the time interval and to disable the meter flow measuring means, whereby the change in volume of test fluid measured by the meter under test during the time interval for the meter flow measuring means is indicative of the volume flow rate of test fluid supplied to the meter under test.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a simplified representation of apparatus provided in accordance with the present invention for proving a fluid flow meter and the like;

DESCRIPTION OF A PREFERRED EMBODIMENT

Figure 1:
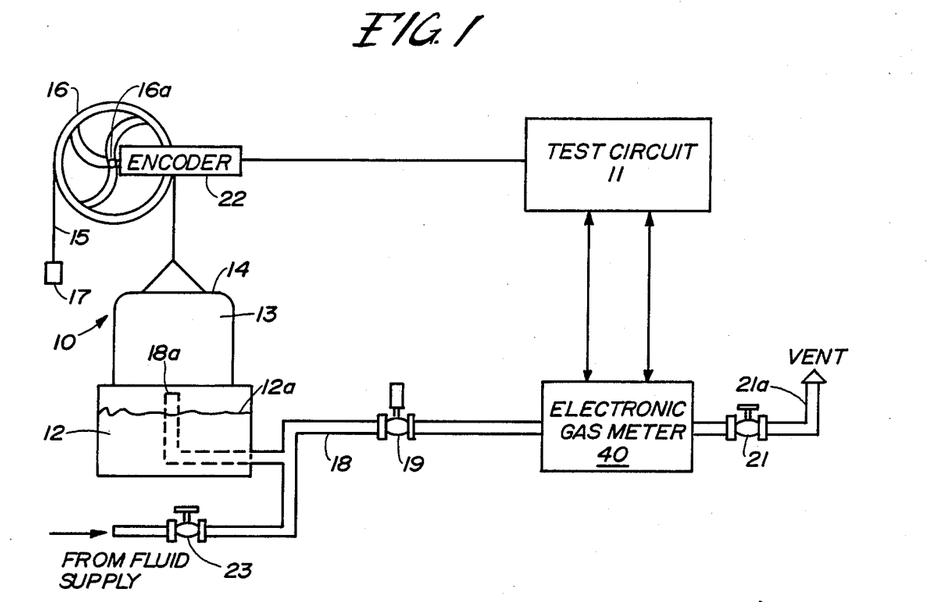

Referring to FIG. 1, there is illustrated a bell prover test type apparatus 10 having an associated test circuit 11 provided in accordance with the present invention for proving a fluid flow meter at low flow rates, and in particular an electronic gas meter 40 of the type disclosed in pending U.S. patent application Ser. No. 140,714, filed Jan. 4, 1988, by Pearman et al, which is entitled ELECTRONIC GAS METER, and which is assigned to the assignee of this application. As fully described in such patent application, the electronic gas meter includes a solid state sensor and solid state processing circuits which employ a sampling technique to register volumetric gas flow through the meter. The meter circuitry includes a timer operable when enabled to generate cycle timing pulses which define operating cycles for the meter. Each operating cycle includes an active period and an inactive period. The gas flow measurement is conducted during the active periods, using a sampling technique.

The bell prover test apparatus 10 includes a conventional test fluid tank 12, and a bell 13 having a closed top 14 which is connected to one end of a cable 15 which passes over a pulley 16 and having its other end connected to a counter weight 17.

The bell 13 is mounted for guided vertical movement within the tank 12, which is filled with water or light oil to a level 12a. The interior of the bell 13 is communicated with the outlet end 18a of a fluid pipeline 18 which is connected to the meter through a flow rate control valve 19 upstream of the gas meter 40 and through a fill or supply valve 23 from a fluid supply. The outlet end 18a of the pipeline 18 is located above the level 12a of the medium within the tank. Test fluid, typically air or natural gas, is admitted to the interior of the bell from the fluid supply through supply valve 23. In the embodiment described herein, the test fluid is assumed to be air, and such air is evacuated from the bell and passed through the gas meter 40 under test during the proof test.

The bell 13 is allowed to fall at a constant rate into the tank 12 causing the air contained therein to flow through the pipeline 18, the flow control valve 19 and through the electronic gas meter 40 and to be exhausted through a start valve 21 downstream of the meter to a vent 21a at the outlet of the start valve 21. The bell is guided in its vertical movement in a manner known in the art of meter proving.

For the purpose of monitoring the position of the bell 13, and thus the amount of air that has passed through the gas meter 40 during a test interval, a shaft encoder 22 is associated with the shaft 16a of the pulley 16. The encoder 22 provides a known number of pulse outputs to the test circuit 11 for each known volume, such as 4292 pulses per cubic foot.

As will be shown, during the proof test, the meter flow rate is measured by passing test fluid through the meter and enabling the meter to measure the flow rate through the meter. This is done by comparing the rate of descent of the bell prover with the instantaneous flow rate recorded by circuits of the electronic gas meter. The rate of descent of the bell prover is obtained by counting the number of clock pulses generated by a clock pulse source for the duration of one pulse from the shaft encoder 22 and comparing the "count rate" which is representative of the bell descent rate, for each test cycle with the instantaneous flow rates obtained from the electronic gas meter circuit. The resultant data is used to determine proof of the meter under test.

Figure 2:
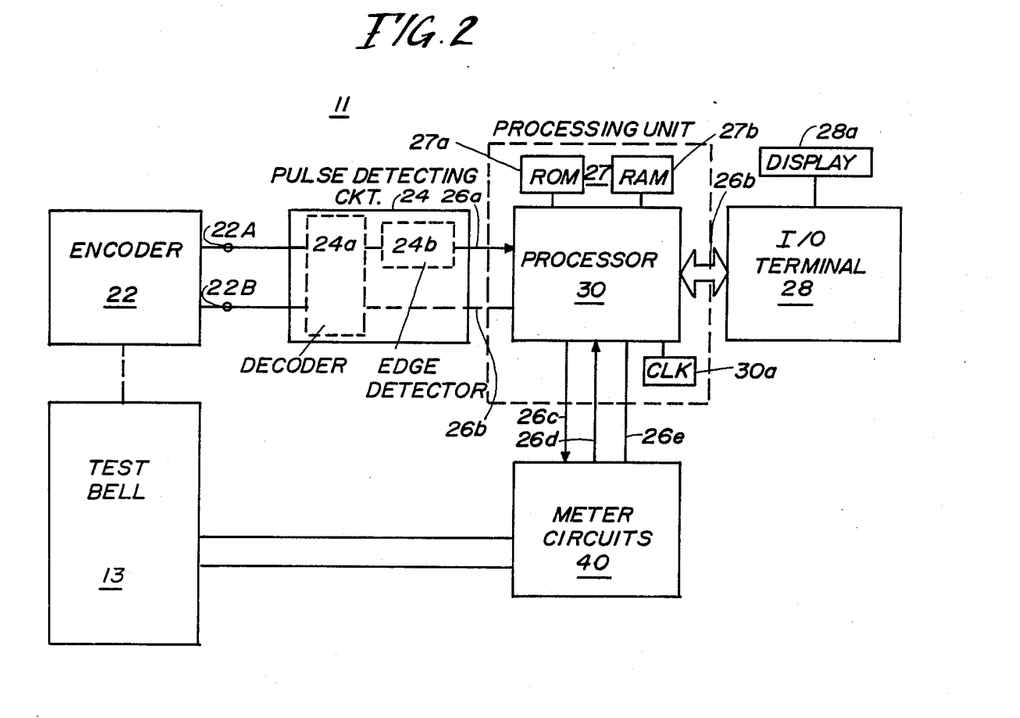
FIG. 2 is a block diagram of the apparatus shown in FIG. 1 but illustrating additional details as to the test circuits.

Referring to FIG. 2, the test circuit 11 includes a pulse detecting circuit 24, a processing unit 26 and an input/output or user interface terminal 28. The pulse detecting circuit 24 includes a decoder circuit 24a and a pulse edge detector 24b connected to an output of the pulse decoder circuit. The pulse decoder circuit 24a has inputs connected to outputs 22A and 22B of the encoder 22. Dual inputs are used to enable detection of both downward and upward directional movement of the test bell. The processing unit 26 includes a processor 30 operating under program control, and memory circuits 27 including fixed memory or ROM 27a for storing the program, and variable memory or RAM 27b for storing data. The processor 30 has programmable inputs/outputs 26a–26d and common 26e which interface the processor with the pulse detecting circuit 24 and the meter 40 under test. The user interface terminal 28 is connected to an input/output interface of the processing unit 26. The processor 30 has an associated clock pulse generating circuit 30a which generates clock pulses at a known frequency for synchronizing the operation of the processor 30.

The user interface terminal 28 enables the user to input to the processing unit 26 commands to initiate a proof test. The user interface terminal may include a suitable display 28a for displaying the results of the meter proof test run.

In one embodiment for the test circuit 11, the processing unit 26 comprised the processing system commercially available as the TATTLETALE MODEL III, from Onset Computer Corp. of Falmouth, Mass. The decoder circuit 24a was the type HCTL 2000 Quad Decoder commercially available from Hewlett Packard. As the bell descends, the decoder circuit 24a counts the pulses generated by the encoder 22 and provides an eight-bit output corresponding to the value of the count. The pulse edge detector 24b responds to the least significant bit output of the decoder circuit 24a and generates an interrupt at the time of occurrence of the leading edge of each encoder pulse.

Figure 4:
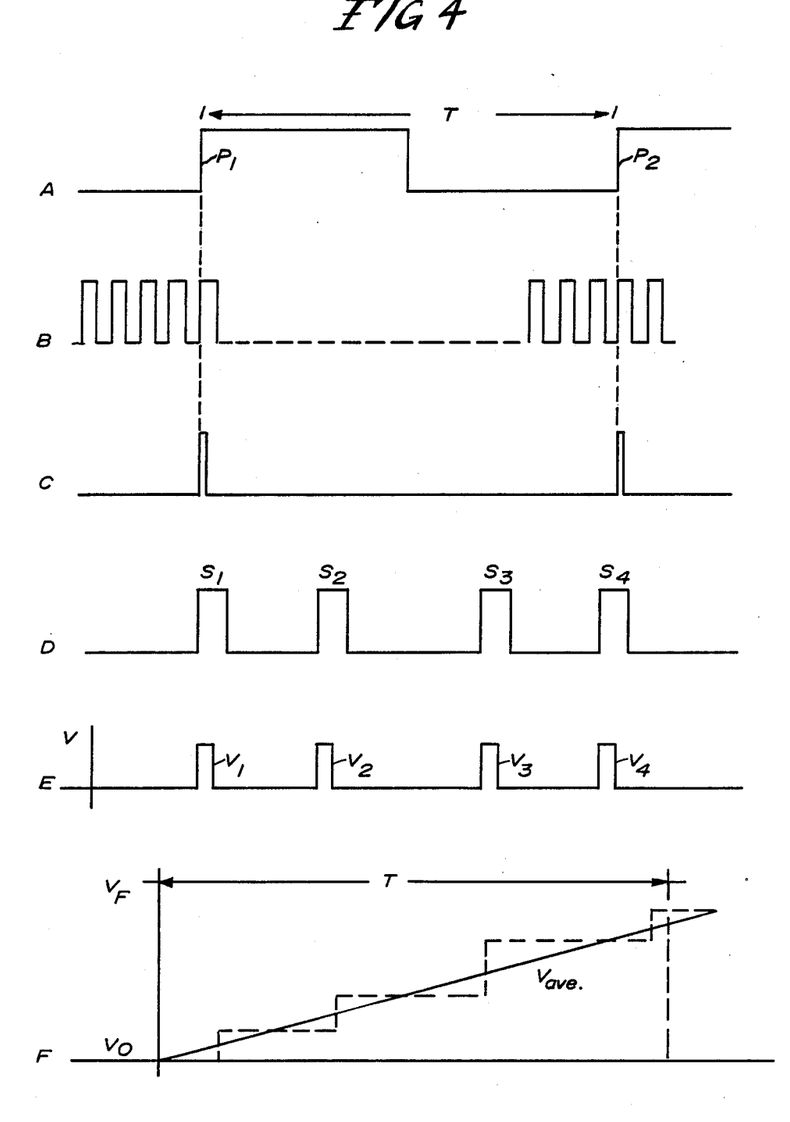
FIG. 4 is a timing diagram illustrating the relationship of signals of the test circuit and electronic meter during a proving operation.

Referring to FIGS. 2 and 4, by way of example, the encoder 22 for the bell prover apparatus generates 4292 pulses for a gas or air flow volume of 1 cubic foot, or one pulse for every 1/4292 of a cubic foot of air or gas flow. To minimize the time required to complete the proof test, the test is based upon a comparison of the instantaneous actual fluid flow rate determined from the rate of decent of the bell prover and the instantaneous fluid flow rate determined by the meter under test.

Referring to FIG. 4, lines A and D, one encoder pulse will typically encompass three to four meter sampling cycles S1, S2, S3, and S4 which occur at a one second rate.

The period T of the encoder output signal (FIG. 4, line A) is measured accurately using the clock frequency of the clock pulse generating circuit 30a associated with processor 30 of the test circuit 11. This is done by counting the number of clock pulses (FIG. 4, line B), generated by the clock pulse generating circuit 30a during one cycle of the encoder output, which is defined by successive leading edges P1 and P2 (FIG. 4, line A) of the encoder output signal. The edge detector 24b generates an interrupt (FIG. 4, line C) at the time of occurrence of the leading edge of each pulse generated by the encoder 22.

It can be shown that the actual flow rate of test fluid supplied by the test bell to the meter under test is given by the relationship:

$$Q = 3600/CPN \text{ (cubic feet per hour)}$$

where:
C = the number of clock pulses per encoder cycle
P = the period of the clock
N = the number of encoder pulses per cubic foot In proving the meter the actual flow rate of the test fluid is compared with the flow measured by the meter during a time corresponding to the period of the encoder output, i.e., the four sample periods S1–S4 (FIG. 4, line D).

Figure 3:
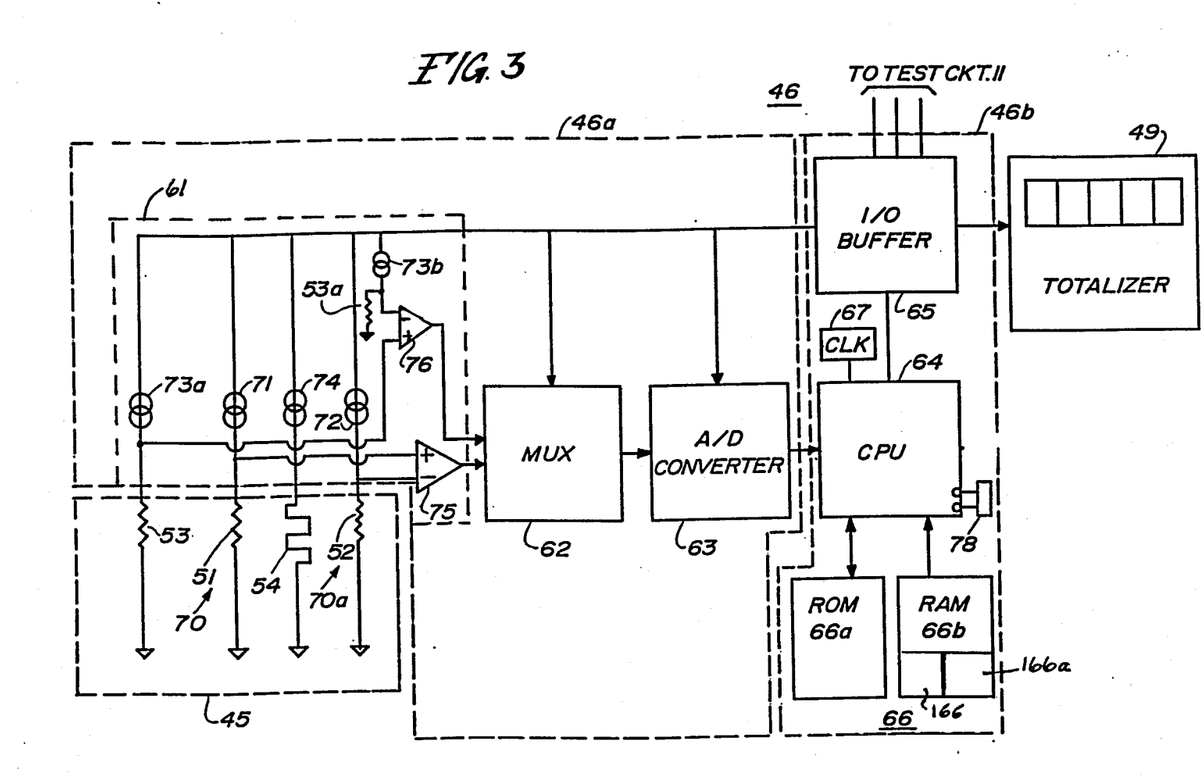
FIG. 3 is a block diagram of a fluid flow meter proven by the apparatus provided by the present invention.

Considering the meter 40 in more detail, referring to FIG. 3, as is described in the referenced patent application, the electronic gas meter 40 includes a solid state sensor 45, electronic signal processing circuits 46, including an analog-to-digital signal processing circuit 46a and a digital signal processing circuit 46b, and an indicating device 49 which provides a digital read out of the quantum of air measured by the meter 40.

The solid state sensor 45 provides a signal output indicative of the gaseous flow rate through the meter. The electronic signal processing circuits 46 sample the signal output of the flow sensor 45 periodically, at a one second rate, and generate a signal indicative of the flow volume measured by the meter over a given time period. This signal is applied to the indicating device 49 which records a reading representative of the cumulative air flow volume measured by the meter. The flow sensor and electronic circuits of the meter are battery-powered and include low-power consuming elements which are operated in a manner so as to conserve the battery life. For example, the electronic circuits operate in an active mode during which the sampling operation is done and a sleep mode during which the flow sensor is 45 deenergized and the electronic circuits 46 are maintained at minimum power usage.

The analog-to-digital signal processing circuit 46a includes a drive and signal acquisition circuit 61, a multiplexing circuit 62, and an analog-to-digital converter 63. The digital signal processing circuit 46b includes a microprocessor system which includes a central processing unit CPU 64, an input/output buffer 65, memory circuits 66, and a real time clock 67. Memory circuits 66 include a read only memory (ROM) 66a which stores the program for operating the meter processing circuit 46 and a random access memory (RAM) 66b which stores operating parameters, system variables and the results of flow rate calculation. Memory 66b includes a sample memory 166 and an accumulator memory 166a.

The flow sensor 45 corresponds to the solid state sensor described in U.S. Pat. No. 4,651,564, and the construction, configuration and operation of the solid state sensor is described in detail in the U.S. Pat. No. 4,651,564, and accordingly will not be described in detail herein.

The temperature sensors 51 and 52 of the solid state flow sensor 45 are connected in arms 70 and 70a of a bridge network, the sensors 51 and 52 being energized by current supplied by respective constant current sources 71 and 72. The heater resistor 54 is energized by a further constant current source 74 and the reference temperature sensor 53 is driven by a constant current source 73a. The temperature sensor's other bridge leg is driven by constant current source 73b. The five constant current sources 71, 72, 73a, 73b and 74 are not continuously energized but are only energized during a sampling interval defined by the central processing unit 64 as will be shown.

The junction temperature sensors 51 and 52 are connected to the non-inverting and inverting inputs, respectively of a differential amplifier 75, the output of which is extended to the multiplexer 62. Reference temperature sensor 53 of the flow sensor 45 and the other bridge leg of the temperature sensor, which includes resistor 53a, are connected to the non-inverting and inverting inputs respectively of differential amplifier 76, the output of which is extended to multiplexer 62. The multiplexer circuit 62 operates under the control of the central processing unit 64 to selectively extend to the analog-to-digital converter circuit 63 the outputs of the differential amplifiers 75 and 76, representing the flow rate of the gaseous fluid measured by the meter 40 and the reference temperature provided by temperature sensor 53. As indicated, the reference temperature reading is sampled less frequently than the flow rate signal provided by the differential amplifier 75.

The analog-to-digital converter circuit 63 receives the output extended thereto from the multiplexer circuit 62 and converts this output signal into a digital signal, which signal is applied to the central processing unit 64. The central processing unit 64 operates under program control to execute the operations necessary to effect the periodic readout of the information provided by the flow sensor, to enable the analog-to-digital converter circuit 63 to receive this information, to read this information from the output of the analog-to-digital converter 63 and to calculate the gaseous fluid flow rate.

The central processing unit 64 through input/output drivers 65 supplies the current meter flow rate information to the indicating device 49 and supplies commands to the analog-to-digital circuit 46a to effect the sensor sampling procedure. A jumper 78 is used to effect a hardware connection of terminals of the processor 64 enabling software routines for the proof test mode.

As described in the referenced application measured flow rate is calculated from a plurality "k" of samples obtained through periodic interrogation of the flow sensor 45 at a one second rate, using a sliding window method in which data representing the newest sample is entered into the memory and data representing the oldest sample is removed from the memory. For example, thirty-two samples of flow rate data are stored in the sample memory 166 and averaged over the time interval for which the samples are obtained. The average flow rate value obtained for each calculation comprises a reading which is stored in the accumulator memory 166a. That is, the values V1, V2, V3, V4, of the readings are added together to provide stored data (FIG. 4, line F) representing the value ($V_f$-$V_0$) measured by the meter for the total volumetric flow through the meter for a given measurement interval "T".

The instantaneous flow rate resulting in the accumulator memory 166a is transferred to the processor 30 of the test circuit 11 for comparison with the encoder frequency measured which is indicative of the test bell flow rate.

As shown in FIG. 4, line E, in the meter under test, a sample pulse V1, V2, V3, V4 is generated each time (S1, S2, S3, S4) (FIG. 4, line D) the output of the gas flow sensor is sampled. The amplitude of the average flow rate pulse is a function of the flow rate measured. These pulses are stored in the sample memory 166. As indicated, thirty-two samples are stored and averaged to provide an indication of instantaneous flow volume. The flow volume result is stored in the accumulator memory 166a which is represented by a signal increase in amplitude as the readings are taken and added to the measurement value stored in the accumulator memory 166a, as shown in FIG. 4, line F. The flow rate through the meter is given by the relationship:

$$Q = f_2(V_f - V_0)$$

where $V_f$ is final value of flow volume stored in the accumulator memory $V_0$ is initial value of flow volume stored in the accumulator memory $f_2$ is a calibration constant The central processing unit 64 through input/output drivers 65 supplies the current meter flow rate information to the test circuit 11 (FIG. 2) and increments the indicating device 49. The central processing unit also supplies suitable commands to the analog-to-digital circuit 46a to effect the sampling procedure.

TEST SEQUENCE OF OPERATION

Figure 5:
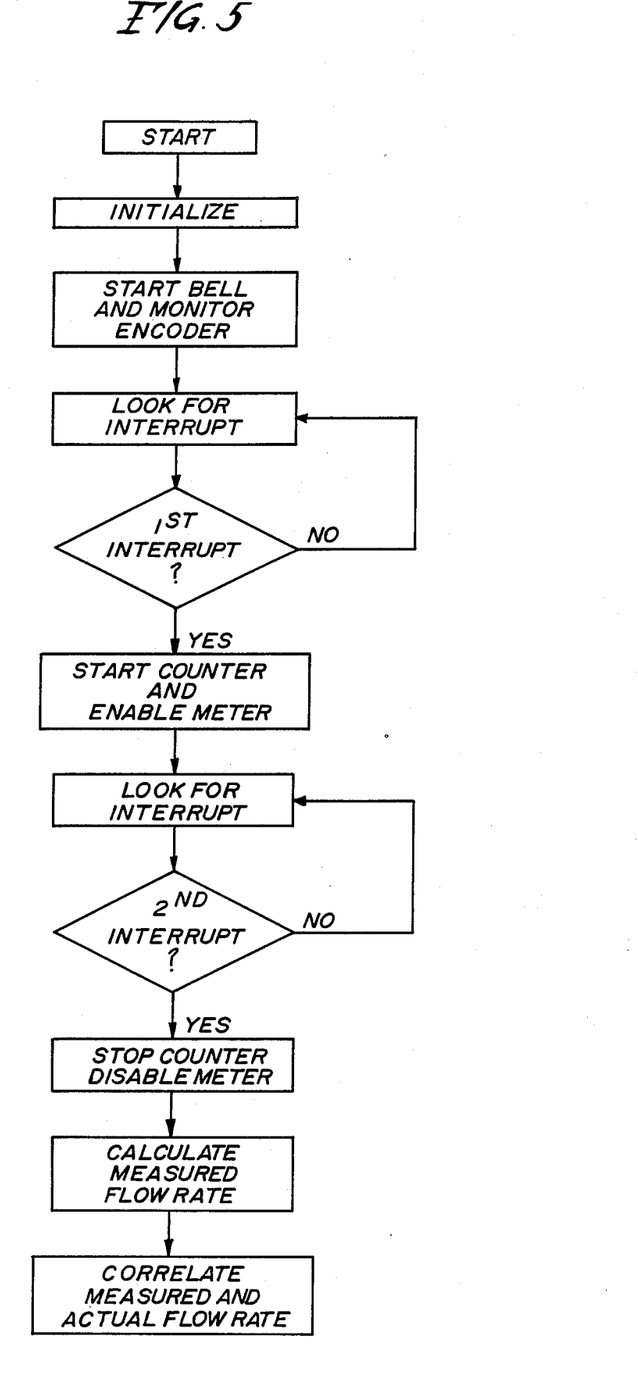
FIG. 5 is a process flow chart illustrating operation of the test circuits.

Referring to FIGS. 1 and 2 and the process flow chart shown in FIG. 5, the test apparatus is set up as shown in FIG. 1 with the electronic gas meter 40 to be proven installed on a test stand (not shown). The jumper 78 (FIG. 3) is set to enable the proof test software routines in the meter processor software. Part of the proof test routine includes holding the meter sampling circuits in an idle mode to prevent sampling until the meter circuits are enabled by a command provided by the processing unit 26. The test bell 13 is positioned at the highest position by setting the fill valve 23 open, with rate valve 19 closed, to fill the bell with test air. The fill valve 23 is closed when the bell 13 is filled. Then the flow rate control valve 19 is adjusted to the flow rate at which the meter is to be proved, typically less than 30% maximum flow rate for the low flow rate proof test.

The bell is allowed to descend at a constant rate. When the test bell is released, the encoder generates a pulse train.

Referring to FIGS. 2, 4 and 5, in response to the leading edge $P_1$ of the first encoder pulse generated following releasing of the test bell, edge detecting circuit 24b generates a first interrupt (FIG. 4, line C). The processor 30 responds to the interrupt and obtains the initial reading $V_0$ of fluid flow volume which was previously registered by the meter 40 (FIG. 4, line F). For the initial reading, the meter accumulator register may be reset to zero under control of the proof test software routines. At the start of the first proof test time interval, the meter circuits are enabled by the processor 30 to begin flow measurement. The processor 30 also begins counting the clock pulses generated by the clock pulse source 30a (FIG. 4, line B). The pulse detecting circuit 24 responds to the leading edge $P_2$ of the next encoder pulse (FIG. 4, line A), and generates a second interrupt, FIG. 4, line C, indicating the end of the last period.

The processor 30 responds to this interrupt to stop counting clock pulses. The processor 30 stores the clock pulse count, as a measure of the time that has elapsed while the test bell passed a test fluid volume during the period of one encoder pulse. Because the frequency of the encoder pulses is known and the volume of test fluid passed through the meter under test for the period of one encoder pulse is known, the actual flow rate can be determined from the time represented by the clock pulse count.

The processor 30 also interrogates the meter 40 to read out the current value $V_f$ of the flow volume registered by the meter. The processor obtains the change in volume flow $V_f$-$V_0$ through the meter 40 during the test interval defined by the period of one encoder pulse to provide data representing measured flow rate.

The meter proof is calculated using the clock pulse count, correlated to amount of test fluid, and the measured value for fluid volume flow $V_f$ and $V_0$ (i.e. the change in volume flow rate registered by the meter) during the time for one cycle of the encoder pulse.

The method and apparatus of the present invention allow accurate proof tests to be conducted at low flow rates for fluid meters of the type which do not have a calibration dial or the like, and which operate in a wake/sleep mode using a method of sampled signals as a means of reducing noise components. In accordance with the present invention, the meter proof test is based upon measuring rate of flow rather than accumulated volume.

I claim:

1. A method for proof testing of an electronic fluid flow meter and the like at low flow rates, comprising:
    supplying test fluid to the meter under test;
    measuring the actual volume flow rate of test fluid supplied to the meter using a volume measurement standard apparatus and a timing means associated with the volume measurement standard apparatus for measuring the interval of time taken for the test fluid to pass through the meter;

enabling the meter to measure the volume flow rate of test fluid supplied to the meter during the time interval measured by said timing means and to provide data indicative of measured volume flow rate during said time interval;

and correlating the measured volume flow rate for the fluid passed through the meter with the actual volume flow rate in proving the operation of the meter.

2. A method according to claim 1, which includes generating timing pulses at a known rate and registering the timing pulses in a pulse counter as a measure of the time taken for the test fluid to pass through the meter.

3. A method according to claim 2, wherein the volume measurement standard apparatus comprises a bell prover including a test bell, wherein measuring the actual volume flow rate of the test fluid includes monitoring the position of the test bell using a position encoder means which generates a plurality of position pulses to indicate the position of the bell as it moves between first and second positions in measuring the actual volume of the test fluid supplied to the meter, and wherein the position pulses generated by the encoder means are used in determining measurement intervals for the meter.

4. A method according to claim 3, wherein the step of registering timing pulses in the pulse counter includes detecting the position pulses, enabling the pulse counter to start counting pulses in response to a first position pulse and causing the pulse counter to stop counting pulses in response to a second position pulse, whereby a known volume of test fluid is supplied to the meter under test in the time duration between said first and second position pulses, and the number of timing pulses counted represents the time taken for the known volume of test fluid to pass through the meter under test.

5. A method for proof testing at low flow rates an electronic fluid flow meter of the type including a solid state fluid flow sensing means, sampling means responsive to said sensing means for providing data signals indicative of the volume flow rate of fluid passing through the meter, and memory means for storing the data signals, said method comprising:

measuring the actual volume flow rate of a test fluid using a bell prover apparatus including a test bell which moves between first and second positions in measuring a volume of test fluid and a timing means associated with the test bell to determine the time taken for the test bell to move between said positions;

passing the measured volume of test fluid through the meter under test;

enabling the sampling means of the fluid flow meter to respond to said sensing means to provide data signals indicative of the volume flow rate of the test fluid supplied to the meter during a time interval determined by the timing means, the timing interval being indicative of the time that the test bell moves between said positions;

storing the data signals in the memory means; and correlating the actual fluid volume flow rate within the data signals stored memory means indicative of the fluid volume flow rate measured by the meter in proving the operation of the meter.

6. A method according to claim 5, wherein measuring the actual volume flow rate includes generating a plurality of timing signals indicative of the instantaneous position of the test bell using a position encoder;

detecting a first position of the test bell by detecting a first signal generated by the encoder;

starting a counter to accumulate timing pulses when the first signal is detected;

detecting a second position of the test bell by detecting a second signal generated by the encoder;

stopping the counter when the second signal is detected, whereby the count registered by the counter is indicative of the time taken for the test bell to move between said positions;

and wherein measuring the volume flow rate of test fluid supplied to the meter includes using the signals generated by the encoder in determining measurement intervals for the meter.

7. In an apparatus for use in proving at low flow rates a fluid flow meter having a solid state flow measuring means, the apparatus including a test bell which is moved between first and second positions in measuring a volume of a test fluid, a position encoder for generating electrical signals indicative of the instantaneous position of the test bell as it moves between the first and second position, and means communicating the test bell with the meter for supplying measured test fluid to the meter, the combination comprising:

pulse detecting means coupled to said encoder to receive the signals generated thereby, and to provide pulses indicative of the duration of at least one of the encoder signals;

controller means including signal processing means; means coupling said signal processing means to said meter flow measuring means;

said signal processing means responding to a first pulse of said pulse detecting means to initiate a time interval and to enable said flow measuring means to measure the volume flow rate of test fluid being passed through the meter;

said signal processing means responding to a second pulse of said pulse detecting means to end said time interval and to disable said meter flow measuring means, whereby the change in volume flow rate measured by the meter under test during the time interval defined by the first and second pulses is indicative of the volume flow rate of test fluid supplied to the meter under test for the duration of said one encoder signal.

8. Apparatus according to claim 7, wherein said pulse detecting means responds to the leading edge of one of the signals generated by said encoder to generate its pulses, the time between successive pulses generated by said pulse detecting means corresponding to the period of the encoder signals.

9. Apparatus according to claim 8, wherein said controller means includes timing means, said timing means generating timing pulses at a cyclical rate, and said signal processing means counting said timing pulses in defining said time interval.

10. A method for proof testing at low flow rates an electronic fluid flow meter including a solid state fluid flow sensor and a signal processing circuit, the flow sensor of the meter providing a signal output indicative of fluid flow measured thereby, the signal processing circuit of the meter including means for generating periodically recurring timing signals defining sampling intervals for the meter, sampling means which samples the signal output of the fluid flow sensor during the sampling intervals to obtain flow measurement data representing the volume flow rate of fluid that has been passed through the meter, and memory means for storing the flow measurement data, the method comprising the steps of:

measuring the actual volume flow rate of a test fluid using a bell prover apparatus including a test bell which moves between first and second positions in measuring a volume of test fluid and a timing means to determine the time taken for the test bell to move between said positions, including using an encoder to generate a plurality of position signals indicative of the instantaneous position of the test bell and a pulse counter for counting timing pulses occurring at a known rate to determine the duration of at least one of the position signals;

passing the measured volume of test fluid through the meter under test;

using at least said one position signal to enable the sampling means of the meter to sample the signal output of the fluid flow sensor to provide data signals indicative of the volume flow rate of the test fluid supplied to the meter during the duration of said one position signal storing the data signals in the memory means; and correlating the actual fluid volume flow rate with the data signals stored in the memory means indicative of the fluid volume flow rate measured by the meter in proving the operation of the meter.

11. Apparatus for proof testing of an electronic fluid flow meter including a solid state fluid flow sensor and a signal processing circuit, the flow sensor of the meter providing a signal output indicative of fluid flow measured thereby, the signal processing circuit of the meter including timing means for generating periodically recurring timing signals defining sampling intervals for the meter, sampling means which samples the signal output of the fluid flow sensor during the sampling intervals to obtain flow measurement data representing the volume flow rate of fluid that has been passed through the meter, and memory means for storing the flow measurement data, said apparatus comprising:

a bell prover means including a test bell which moves between first and second positions in measuring a volume of test fluid;

timing means coupled to said test bell for determining the time taken for the test bell to move between said positions said timing means including a position encoder generating a plurality of position signals indicative of the instantaneous position of the test bell, means for generating timing pulses at a known rate, pulse counting means, and means responsive to at least one of said position signals for enabling said pulse counting means to count the number of timing pulses generated during the duration of said one position pulse;

means for communicating, the test bell with the meter under test for passing the measured volume of test fluid through the meter;

means responsive to at least one of the position pulses generated by said encoder for enabling the sampling means of the meter to sample the signal output of the fluid flow sensor to provide data signals indicative of the volume flow rate of the test fluid supplied to the meter during the duration of said one position signal and store the data signals in said memory means; and means for correlating the actual fluid volume flow rate with the fluid volume flow rate measured by the meter, as represented by the data signals stored in the memory means, in proving the operation of the meter.

* * * * *